May 25, 1954 D. A. BENNETT ET AL 2,679,130

DISK TRANSPORT ATTACHMENT

Filed Dec. 2, 1948

Inventors
David A. Bennett & Roy E. Bennett
by Harry L. Yinger
Attorney

Witness
Edward P. Seeley

Patented May 25, 1954 2,679,130

UNITED STATES PATENT OFFICE 2,679,130

DISK TRANSPORT ATTACHMENT

David A. Bennett and Roy E. Bennett,
Lenox, Iowa

Application December 2, 1948, Serial No. 63,112

4 Claims. (Cl. 55—73)

This invention relates to a disc transport and more particularly to a wheel to be attached to a disc in pairs so the disc can be attached to a tractor unit and towed to the point of use.

The blades of a disc must be kept sharp so the disc will operate effectively when the disc is pulled through a plowed field. The disc cannot be pulled over road surfaces to a point of use because the blades would be dulled. Discs have been mounted on drags and wagons and transported to the point of use where the discs are unloaded; the drag or wagon is uncoupled from the tractor and the disc hitched to the tractor. It is with the problem of providing a new and improved disc transport that the present invention is involved.

It is an object of the invention, among others, to provide a disc transport that is attached to the disc and becomes a part of the disc with the disc coupled to a tractor to be towed to the point of use after which the disc transport is removed from the disc and the disc and tractor are ready to proceed with no further uncoupling or coupling.

It is a further object of the invention to provide a disc transport that saves disc blades and bearings while moving the discs at high speed on roads and from field to field; cuts down on time necessary to get discs from place to place by allowing higher speed transportation; the disc transports are simple to mount on a disc and are simple to remove; a disc transport that may be adjusted to any type disc; and a disc transport that can be mounted in five minutes and removed in a like time.

It is a still further object of the invention to provide a disc transport that attaches ridgedly to a disc and there is nothing to work loose; is equipped with standard wheels, tires and tubes; and may be used with tractors, trailers, wagons and trucks of all kinds.

It is a still further object of the invention to provide a disc transport that is simple in construction and operation, easy to operate and economical both in construction and operation, a disc transport that is long lasting, simple in design and easy of repair in case of breakdown; a disc transport requiring no special skill on the part of an operator to mount on a disc; and a disc transport that can be supplied and operated at an economical price.

With the foregoing and other objects in view, the invention will be more fully described herewith and will be particularly pointed out in the claims appended hereto.

In the drawings, wherein like symbols refer to like or corresponding parts throughout the several views.

Figures 1, 2:
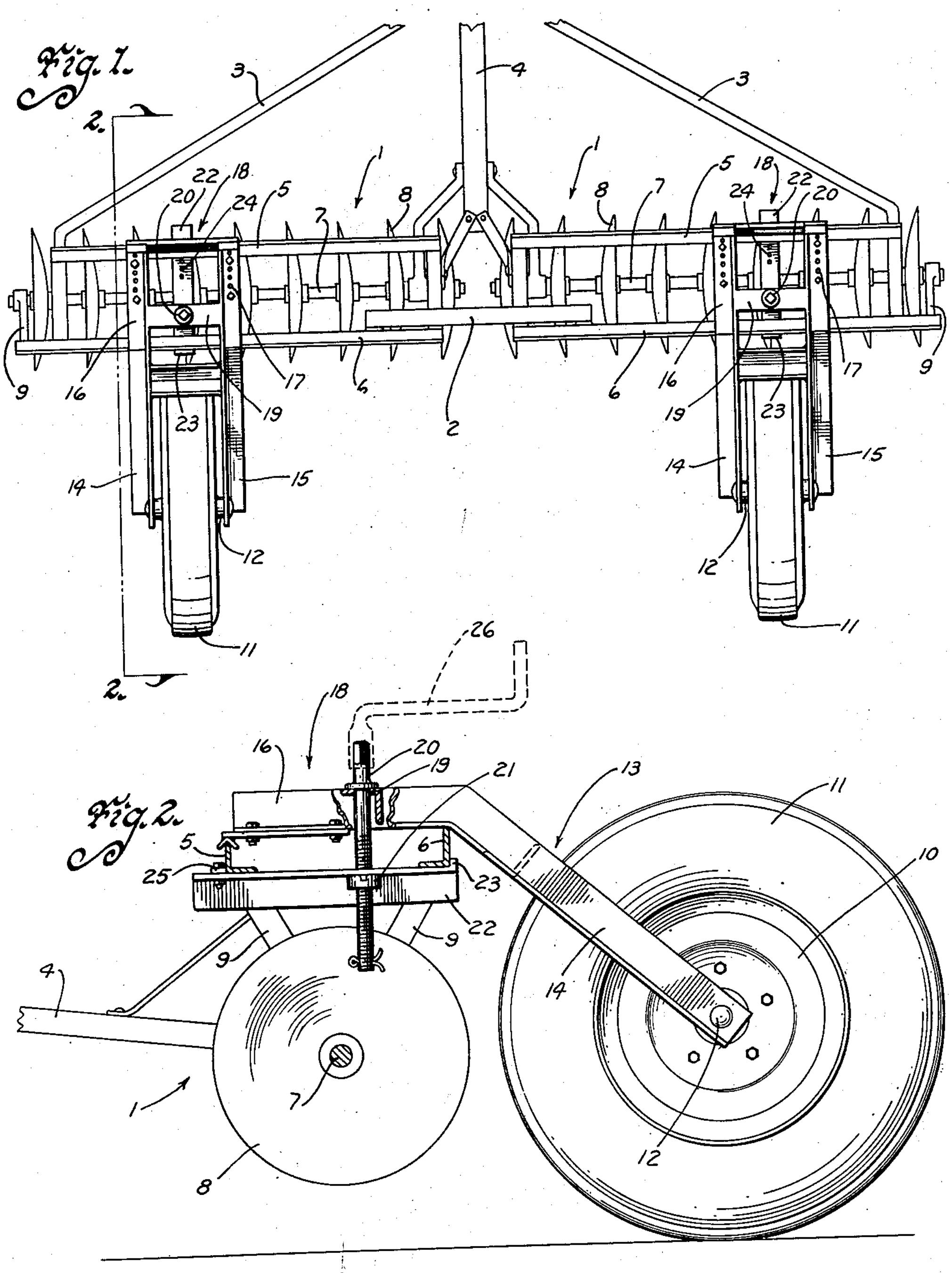
Figure 1 is an elevation view from the top showing disc transports attached to a disc.
Figure 2 is a sectional view taken on the line 2—2 of Figure 1.

Referring to Figure 1, representative discs 1 are shown connected together by a connecting member 2. Side members 3 converge on each other and are connected to the outer end of each disc 1 while a member 4 connects to each inner end of the discs 1. The members 3 and 4 all connect together (not shown) and one hitch leads from the convergence points of the members 3 and 4.

Each disc has a top supporting structure made up of longitudinally extending angle bars 5 and 6 attached to the axe 7 of each disc, which axle 7 carries the disc blades 8. The angle bars 5 and 6 are supported by members 9 clearly shown in Figure 2 with the members 9 suitably attached to the axle 7 and the angle irons 5 and 6.

The disc transport takes the form of a regular 16 inch automobile wheel 10 having a regular automobile tire and tube 11 mounted on the wheel 10. The wheel 10 has an axle 12 mounted in high speed roller bearings within the wheel about which the wheel 10 rotates.

Attached to each end of the axle 12 is a yoke member 13 having two arms 14 and 15, which arms 14 and 15 may be made of angle irons. The arms 14 and 15 extend upwardly for a substantial distance after which the arms 14 and 15 are bent downwardly into arms 16 and 17 to form a horizontal portion 18. A flat metallic strip 19 extends between the arms 16 and 17 and receives a clamping means to attach the yoke member 13 and wheel 10 to a disc.

A bolt 20 extends through the strip 19 and is movable within the strip 19 both longitudinally and rotatably. The lower end of the bolt 20 is screw threaded and attaches into a nut 21 welded to a clamping plate 22. The clamping plate 22 has one end thereof with a raised portion 23 and the other end has a series of openings 24 (Figure 1) into which a headed bolt 25 may be placed to make the clamping plate 22 adjustable so it will closely fit the under portion of the supporting structure formed by angle irons 5 and 6. For different type tractors, the spacing of angle irons 5 and 6 will be different.

In operation, the clamping bar 22 is run down to the bottom of the threads on the bolt 20 by turning bolt 20 by wrench 26. With the clamping bar 22 in this position the clamping bar 22 can be inserted under the supporting structure or angle irons 5 and 6 as the blades 8 rest on the ground. The bolt 25 is placed in the proper opening 24 for the spacing of the angle irons 5 and 6. The bolt 20 is then turned to lift the clamping bar 22 until the clamping bar 22 contacts the lower portion of the angle irons 5 and 6. The portion 23 and bolt 25 then extend along the sides of angle irons 5 and 6 and prevent any relative movement between the yoke member 13 and the disc. The disc is lifted to the position of Figure 2 by the turning of the bolt 20. To uncouple, the bolt 20 is turned in the opposite direction by wrench 26 and the clamping bar 22 is lowered.

While the invention has been described in connection with several specific embodiments, it is to be understood that the words which have been used are words of description rather than limitation, and that practice of the invention within the scope of the appended claims may be resorted to without departing from the true scope of the invention in all its aspects.

We claim:

1. In a device of the class described designed for use with a farm cultivating implement having a frame, a pair of like wheel units capable of being detachably secured to said frame; each of said wheel units comprising; a rigid beam member having a bend in its center length portion, a wheel rotatably mounted on the one end of said beam, and a manually operated screw clamp means on the other end of said beam, said beam member capable of extending above and over the frame of a farm cultivating implement and said screw clamp capable of drawing the frame of a farm cultivating implement and said beam together and thus elevating and supporting said cultivating implement above the ground.

2. In a device of the class described designed for use with a farm cultivating implement having a frame, a pair of like wheel units capable of being detachably secured to said frame; each of said wheel units comprising; a rigid beam member having a bend in its center length portion, a wheel rotatably mounted on the one end of said beam, and a manually operated screw clamp means on the other end of said beam, said beam member capable of extending above and over the frame of a farm cultivating implement and said screw clamp capable of securing said beam and said frame rigidly and detachably together.

3. In a disc transport, a frame having a bend in its length and having upper and lower ends, a wheel rotatably journalled near the lower end of said frame, a clamping plate disposed below the upper end of said frame, means for drawing said clamping plate toward said upper end of said frame, and means for holding said clamping plate unyieldingly in relation to said upper end of said frame for rigidly clamping an element disposed between said clamping plate and said upper end of said frame to said frame.

4. In a disc transport, a frame having a bend in its length having upper and lower ends; said frame comprising two spaced beams rigidly secured together in laterally spaced relation to each other, a wheel journalled between the ends of said beams at the lower end of said frame, a clamping plate disposed near the upper end of said frame, and means for drawing said clamping plate toward and holding it unyieldingly in relation to said upper end of said frame; whereby said upper end of said frame may be rigidly secured to a disc.

References Cited in the file of this patent

UNITED STATES PATENTS

| Number | Name | Date |
|---|---|---|
| 496,285 | Stely | Apr. 25, 1893 |
| 864,189 | Peddy | Aug. 27, 1907 |
| 904,270 | Lippy | Nov. 17, 1908 |
| 1,020,983 | Heylman | Mar. 26, 1912 |
| 1,025,767 | Waterman | May 7, 1912 |
| 1,120,938 | Hazard | Dec. 15, 1914 |
| 1,220,485 | Ahrenholtz | Mar. 27, 1917 |
| 1,428,506 | Krebs | Sept. 5, 1922 |
| 1,901,183 | McKahin | Mar. 14, 1933 |
| 2,141,805 | White | Dec. 27, 1938 |
| 2,164,550 | Steward | July 4, 1939 |
| 2,226,586 | Seaholm | Dec. 31, 1940 |
| 2,496,153 | Eaves et al. | Jan. 31, 1950 |
| 2,500,700 | Niles | Mar. 14, 1950 |